(12) United States Patent
Sha et al.

(10) Patent No.: US 11,500,209 B2
(45) Date of Patent: Nov. 15, 2022

(54) METHOD, ELECTRONIC DEVICE, AND COMPUTER PROGRAM PRODUCT FOR DISPLAYING GRAPHIC INTERFACES

(71) Applicant: EMC IP Holding Company LLC, Hopkinton, MA (US)

(72) Inventors: Danqing Sha, Shanghai (CN); Zhen Jia, Shanghai (CN); Anzhou Hou, Shanghai (CN); Bin He, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/181,080

(22) Filed: Feb. 22, 2021

(65) Prior Publication Data

US 2022/0244536 A1    Aug. 4, 2022

(30) Foreign Application Priority Data

Jan. 29, 2021   (CN) .......................... 202110127813.7

(51) Int. Cl.
| | | |
|---|---|---|
| *G02B 27/01* | (2006.01) | |
| *G06T 19/00* | (2011.01) | |
| *H04L 67/10* | (2022.01) | |
| *G06F 3/0484* | (2022.01) | |

(52) U.S. Cl.
CPC ....... *G02B 27/0172* (2013.01); *G06F 3/0484* (2013.01); *G06T 19/006* (2013.01); *H04L 67/10* (2013.01); *G06F 2203/04803* (2013.01)

(58) Field of Classification Search
CPC .. G06F 3/0484; G02B 27/0172; G06T 19/006
See application file for complete search history.

(56) References Cited

U.S. PATENT DOCUMENTS

| | | | |
|---|---|---|---|
| 2019/0130648 A1* | 5/2019 | Duca ....................... | G06T 13/40 |
| 2020/0193649 A1* | 6/2020 | Moon ..................... | G06T 11/00 |

OTHER PUBLICATIONS

M. Chen et al., "Spatiotemporal GMM for Background Subtraction with Superpixel Hierarchy," IEEE Transactions on Pattern Analysis and Machine Intelligence, vol. 40, No. 6, Jun. 2018, 8 pages.

(Continued)

*Primary Examiner* — Nelson M Rosario
*Assistant Examiner* — Scott Au
(74) *Attorney, Agent, or Firm* — Ryan, Mason & Lewis, LLP

(57) ABSTRACT

A method, an electronic device, and a computer program product for displaying graphic interfaces are provided in embodiments of the present disclosure. The method includes: generating a first graphic interface associated with an operation performed by a user of a wearable device at a computing device connected to the wearable device; causing a display device of the computing device to display the first graphic interface; and causing the wearable device to display at least a second graphic interface, the second graphic interface being obtained by extending the first graphic interface. In this way, a plurality of graphic interfaces can be efficiently displayed with both a physical display device and a wearable device.

20 Claims, 6 Drawing Sheets

(56) References Cited

OTHER PUBLICATIONS

J. Huang et al., "An Efficient Optical Flow Based Motion Detection Method for Non-stationary Scenes," 2019 IEEE Chinese Control and Decision Conference (CCDC), Jun. 3-5, 2019, pp. 5272-5277.
J. Redmon et al., "You Only Look Once: Unified, Real-Time Object Detection," 2016 IEEE Conference on Computer Vision and Pattern Recognitions (CVPR), Jun. 27-30, 2016, 10 pages.
U.S. Appl. No. 17/079,632 filed in the name of Zhen Jia et al., filed Oct. 26, 2020, and entitled "Method, Device, and Computer Program Product for Managing Virtual Visual Content."

* cited by examiner

METHOD, ELECTRONIC DEVICE, AND COMPUTER PROGRAM PRODUCT FOR DISPLAYING GRAPHIC INTERFACES

RELATED APPLICATION(S)

The present application claims priority to Chinese Patent Application No. 202110127813.7, filed Jan. 29, 2021, and entitled "Method, Electronic Device, Computer Program Product for Displaying Graphic Interfaces," which is incorporated by reference herein in its entirety.

FIELD

Embodiments of the present disclosure relate to the field of computers, and more particularly, to a method, an electronic device, and a computer program product for displaying graphic interfaces.

BACKGROUND

With the development of information technologies, the requirements for graphic interfaces displayed by display devices such as computers and smart phones have become increasingly higher. For example, it is expected that a graphic interface displayed by a display device can have a large area, so as to provide a user with richer information. This can be achieved by, for example, causing two or more interconnected physical displays to respectively display a plurality of associated graphic interfaces. However, due to limitations such as the number, cost, and fixed locations of physical display devices and the need to occupy physical space, the display based on physical display devices has been unable to provide the user with a low-cost display with good visual experience.

SUMMARY

Illustrative embodiments of the present disclosure provide a solution for displaying graphic interfaces.

In a first aspect of the present disclosure, a method for displaying graphic interfaces is provided, the method including: generating a first graphic interface associated with an operation performed by a user of a wearable device at a computing device connected to the wearable device; causing the display device of the computing device to display the first graphic interface; and causing the wearable device to display at least a second graphic interface, the second graphic interface being generated based on the first graphic interface and sensing data associated with the operation acquired by the wearable device.

In a second aspect of the present disclosure, an electronic device is provided, including a processor; and a memory coupled to the processor and having instructions stored therein, wherein the instructions, when executed by the processor, cause the electronic device to execute actions comprising: generating a first graphic interface associated with an operation performed by a user of a wearable device at a computing device connected to the wearable device; causing the display device of the computing device to display the first graphic interface; and causing the wearable device to display at least a second graphic interface, the second graphic interface being generated based on the first graphic interface and sensing data associated with the operation acquired by the wearable device.

In a third aspect of the present disclosure, a computer program product is provided. The computer program product is tangibly stored on a computer-readable medium and includes machine-executable instructions. The machine-executable instructions, when executed, cause a machine to perform any steps of the method according to the first aspect.

This Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

The above and other objectives, features, and advantages of the present disclosure will become more apparent from the following description of example embodiments of the present disclosure, to be viewed in combination with the accompanying drawings. In the example embodiments of the present disclosure, the same or similar reference numerals generally represent the same or similar parts. In the accompanying drawings.

DETAILED DESCRIPTION

The principles of the present disclosure will be described below with reference to some example embodiments shown in the accompanying drawings.

As used herein, the term "include" and variations thereof mean open-ended inclusion, that is, "including but not limited to." Unless specifically stated, the term "or" means "and/or." The term "based on" means "based at least in part on." The terms "an example embodiment" and "an embodiment" indicate "a group of example embodiments." The term "another embodiment" indicates "a group of additional embodiments." The terms "first," "second," etc. may refer to different or the same objects. Other explicit and implicit definitions may also be included below.

As discussed above, in order to provide a user with a good visual experience, a plurality of interconnected physical display devices are usually used to provide a plurality of graphic interfaces. However, the cost of configuring a plurality of physical display devices is high, the configured physical display devices need to occupy a certain physical space, and the physical display devices are difficult to move. Therefore, it is difficult for such a solution to efficiently display a plurality of graphic interfaces, thus limiting the user experience.

In order to get rid of the above limitations of physical display devices, a plurality of graphic interfaces may be displayed through a wearable device such as a virtual reality or augmented reality (AR)-based device. However, displaying only based on the wearable device cannot enable the user to fully interact with the physical display device and the computing device connected thereto. In addition, such a solution cannot utilize high computing resources of the computing device, and it is difficult to provide the user with a better user experience only by using the limited computing resources of the wearable device.

In order to at least partially address the above shortcomings, the embodiments of the present disclosure provide a solution of displaying graphic interfaces, for displaying a plurality of graphic interfaces cooperatively by a physical display device together with a wearable device, such as an AR-based device, capable of providing virtual display. Through a plurality of sensors configured by the AR device and/or connected to the display device, the user can perform various forms of operations (for example, a gesture operation, a body posture operation, an eye movement operation, a voice input operation, and other operations recognizable by a traditional input device) to control the displayed plurality of image interfaces and/or interface elements in the plurality of image interfaces.

The solution can achieve extended display at a low cost, is not limited by the number and locations of physical display devices, and can make the display of the wearable device smoother, thus leading to a good user experience.

Figure 1:
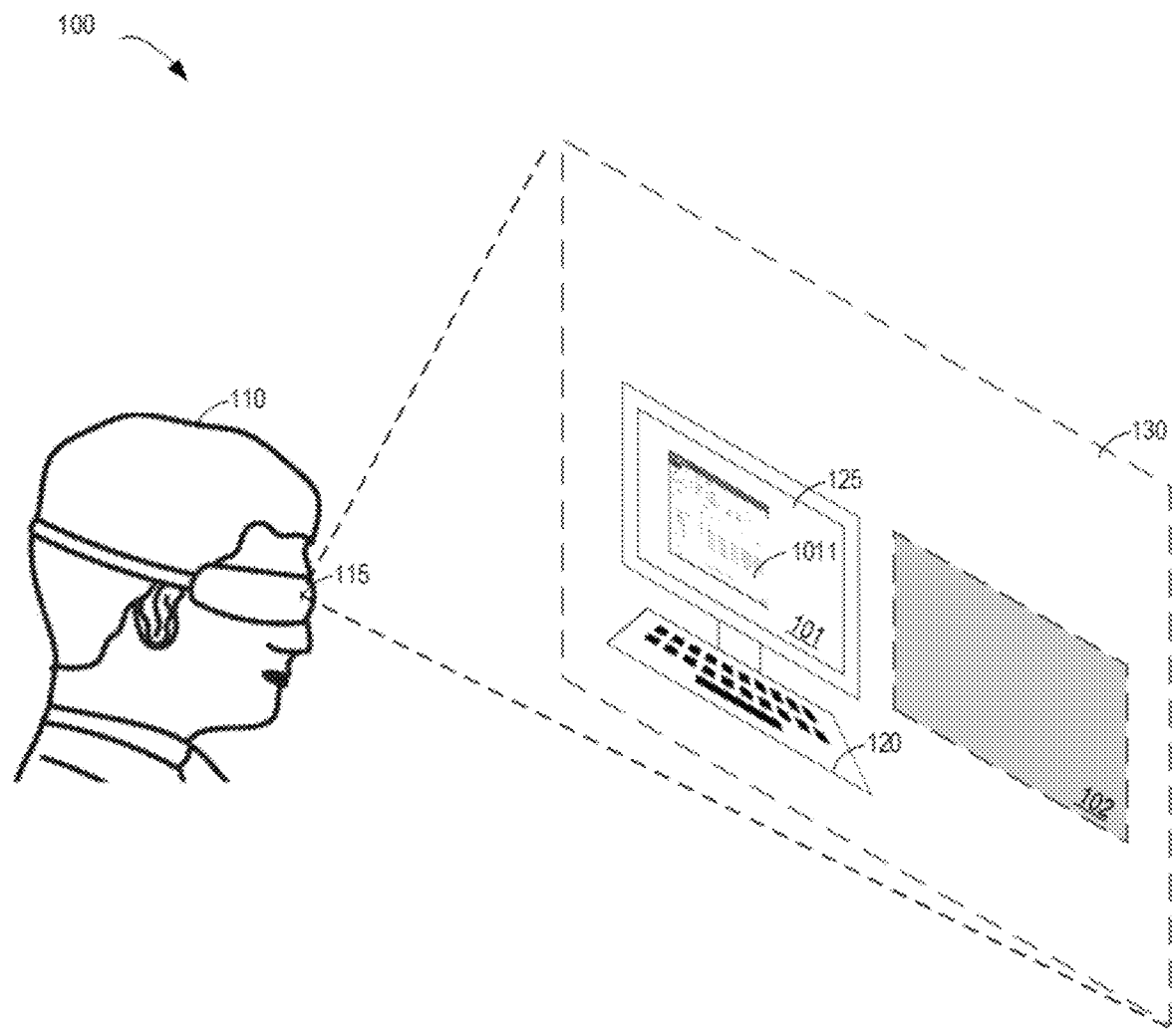
FIG. 1 is a schematic diagram of an example environment according to an embodiment of the present disclosure.

FIG. 1 is a schematic diagram of example environment 100 according to an embodiment of the present disclosure. In the example environment, a device and/or a method according to an embodiment of the present disclosure may be implemented. As shown in FIG. 1, the example environment may include computing device 120. Computing device 120 may have display device 125 (for example, a display screen) or be connected to the display device in other manners.

Computing device 120 may be any device with a computing capability. As a non-limiting example, computing device 120 may be any type of fixed computing device, mobile computing device, or portable computing device, including but not limited to a desktop computer, a laptop computer, a notebook computer, a netbook computer, a tablet computer, a multimedia computer, a smart phone, a smart watch, and the like. All or part of the components of computing device 120 may be distributed in the cloud. Computing device 120 may also adopt a cloud-edge architecture. Computing device 120 at least includes a processor, a memory, and other components usually present in a general-purpose computer, so as to implement functions such as computing, storage, communication, and control. In some embodiments, computing device 120 may be connected to various input devices. Additionally or alternatively, the input device may also include various types of sensors for inputting sensing data, and the sensors include, but are not limited to, a camera installed on or near the display device, a gesture tracking device, an eye tracking device, and a voice recognition device.

Computing device 120 may be connected to wearable device 115 of user 110 through a wireless or wired connection. In some embodiments, wearable device 115 includes an AR device, such as a head-mounted display (HMD) of AR glasses, which may be worn on the head of user 110, for example. The HMD may include a transmission HMD based on optical principles (Optical See-through HMD) and a transmission HMD based on the video synthesis technology (Video See-through HMD). In some embodiments, wearable device 115 includes a display, a processor, and sensors such as a camera, a gesture tracking device, an eye tracking device, a voice recognition device, and an inertial measurement unit (IMU).

It will be understood that through wearable device 115 such as the HMD, user 110 can interact with a virtual object that is presented in a real environment. For example, user 110 can see, through wearable device 115 in field of view 130, graphic interface 101 (sometimes referred to as the first graphic interface in this text) displayed on display device 125, for example, a desktop, which may have (multiple) interface element(s) 1011 such as windows. User 110 may also see, through wearable device 115 in field of view 130, the virtual object, i.e., virtual graphic interface 102 (sometimes referred to as the second graphic interface herein) displayed through wearable device 115, which may also have various interface elements.

In some embodiments, graphic interface 101 and virtual graphic interface 102 may be the same. In other words, virtual graphic interface 102 is a copy of graphic interface 101. In some embodiments, graphic interface 101 and virtual graphic interface 102 may be different. In other words, virtual graphic interface 102 may be an extension of graphic interface 101. For example, display device 125 may be set as a master display device configured to display a main graphic interface (for example, the desktop), and wearable device 115 may be set as a slave display device configured to display the extended graphic interface (for example, the desktop extension), and vice versa. Graphic interface 101 and virtual graphic interface 102 may have completely coordinated view designs.

In some embodiments, graphic interface 101 and virtual graphic interface 102 may include a desktop of an operating system such as Windows. In some embodiments, graphic interface 101 and virtual graphic interface 102 may include desktops based on Virtual Desktop Infrastructure (VDI) applications, which may be based on an edge-core-cloud structure.

The sensing data may be acquired by the sensors of wearable device 115 and/or computing device 120 sensing user 110 (for example, various operations performed by the user) and/or the real environment (for example, the scenario that can be seen by the user), and can therefore represent user 110 and/or the real environment. Based on the sensing data, corresponding graphic data and a graphic interface corresponding thereto may be generated for use by wearable device 115 and/or display device 125 to display the graphic interface. For example, through a camera, a series of image data for the user and/or real environment may be acquired, and display device 125 may be identified therefrom. Through the location of display device 125 in the image, the location of the display device in the field of view can be determined. For another example, data such as the gaze direction of the user and the eye or eyeball movement (for example, blinking) may be acquired through the eye tracking device. Data related to a specific gesture performed by the user may be acquired through the gesture tracking device. Data related to the movement of the user may be acquired through the IMU. Data related to the user voice and/or environmental sound may be acquired through the voice recognition device. It is understandable that the sensing data from different sensors may be used in combination to determine an operation performed by the user, and then determine an action intended by the user on the corresponding graphic interface and/or interface element in the graphic interface.

The operation performed by the user may include at least one of the following: a positioning operation, a click operation, a drag operation, and a scroll operation input via a pointing device, a touch operation input via a touch device, a voice command operation input via a voice recognition device, and a gesture operation, a body posture operation, and an eye movement operation input via a sensor. In some embodiments, the operation performed by the user may be a combination of any of the above operations.

The actions for the interface elements in the graphic interface may include at least one of the following: moving, scaling, closing, and opening the interface elements.

The actions for the graphic interface may include at least one of the following: moving the graphic interface in the field of view, adjusting the display direction of the graphic interface, adjusting the scaling of the graphic interface, adjusting the display resolution of the graphic interface, creating a new graphic interface, selecting a given graphic interface, and the like.

In some embodiments, a corresponding relationship between an operation performed by the user and an action on an interface element in a graphic interface or an action on a graphic interface may be predefined by the user. Some specific examples will be discussed in detail below with reference to FIG. 2 to FIG. 5.

It should be understood that the architecture and functions of environment 100 are described for illustrative purposes only, and do not imply any limitation to the scope of the present disclosure. The embodiments of the present disclosure may also be applied to environments having different structures and/or functions. For example, in the range of field of view 130, there may be a greater number of display devices for displaying a greater number of graphic interfaces and/or a greater number of virtual graphic interfaces may be displayed.

A process according to an embodiment of the present disclosure will be described in detail below with reference to FIG. 2 to FIG. 5. For ease of understanding, specific data mentioned in the following description is illustrative and is not intended to limit the protection scope of the present disclosure. It should be understood that embodiments described below may also include additional actions not shown and/or may omit actions shown, and the scope of the present disclosure is not limited in this regard.

Figure 2:
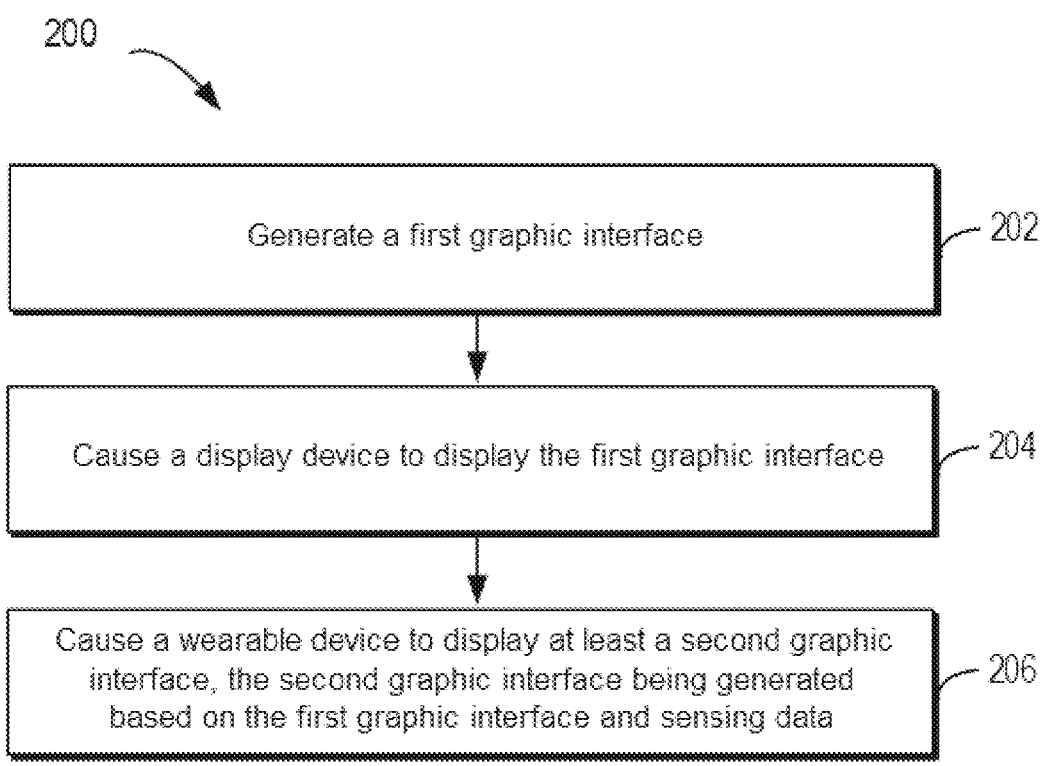
FIG. 2 is a flowchart of a process of displaying graphic interfaces according to an embodiment of the present disclosure.

FIG. 2 is a flowchart of process 200 for displaying graphic interfaces according to an embodiment of the present disclosure. Process 200 may be implemented in computing device 120 as shown in FIG. 1. Process 200 will be described specifically below with reference to FIG. 1.

In 202, computing device 120 may generate first graphic interface 101 associated with an operation performed by user 110 of wearable device 115.

Specifically, computing device 120 may be connected to wearable device 115 (for example, via a wired connection or a wireless connection). It is understandable that first graphic interface 101 may be changed due to an operation performed by user 110. For example, the user may perform an operation corresponding to a closing action of closing interface element 1011 (e.g., a window) in first graphic interface 101. Correspondingly, first graphic interface 101 will be changed, for example, graphic interface element 1011 will no longer be used. Therefore, computing device 120 may, for example, generate first graphic interface 101 in a real-time manner, for example, graphic data corresponding to the first graphic interface, so that the change to first graphic interface 101 can be accurately delivered to user 110.

In 204, computing device 120 may cause display device 125 to display the first graphic interface.

Specifically, computing device 120 may control display device 125 connected thereto to display first graphic interface 101 based on the graphic data (for example, generated in real time). It is understandable that when an operation performed by the user will cause the first graphic interface to change, computing device 120 may cause the first graphic interface displayed by display device 125 to change.

In 206, computing device 120 may cause the wearable device to display at least a second graphic interface.

Specifically, the wearable device may control a display device included therein to display second graphic interface 102 based on graphic data (for example, generated in real time). The graphic data may be generated based on the first graphic interface and sensing data associated with the user operation.

In some embodiments, the sensing data may be acquired by the wearable device based on the sensor included therein as described above. Additionally or alternatively, the sensing data may also be acquired by a sensor set near the display device and connected to the computing device. In some embodiments, the above two kinds of sensing data may be fused to more accurately identify the user and/or the real environment.

In some embodiments, the parameter of the second graphic interface may be predefined by the user, and the parameter of the second graphic interface includes at least one of the following: the display direction, size, resolution, interface element scaling rate, and refresh frequency of the second graphic interface, and a location relationship between the second graphic interface and the first graphic interface.

In some embodiments, graphic data for the second graphic interface may be determined based on the predefined parameter, the first graphic interface, and the sensing data, and the graphic data indicates image content displayed in a target area for displaying the second graphic interface on the display device of the wearable device.

In some embodiments, the predefined parameter may also be adjusted correspondingly based on the sensing data, so as to adaptively generate the second graphic interface. For example, if it is detected that in the field of view, the size of the space that can be used to display the second graphic interface is insufficient to display the second graphic interface in a predetermined size, the size of the second graphic interface may be automatically adjusted, or a location relationship between the second graphic interface and the first graphic interface may be adjusted, for example, the distance between the two is reduced, or the second graphic interface originally displayed at the left side of the first graphic interface is displayed in another area with sufficient space (for example, at the opposite side, upper side, or lower side).

In this way, with both the physical display device and the wearable device, at least one extended graphic interface can be displayed through, for example, an AR-based device on the basis of the existing physical display device that displays a graphic interface, thereby efficiently displaying a plurality of graphic interfaces in a low-cost manner.

In some embodiments, a strategy such as edge-core-cloud may be adopted, so that the sensing data sensed by the wearable device may be sent to the computing device for processing. The computing device may receive the sensing data from the wearable device, and generate graphic data related to the second graphic interface based on the sensing data and the first graphic interface. In some embodiments, the computing device may adopt a cloud/edge architecture, and may send the generated graphic data to the wearable device, so that the wearable device displays the second graphic interface. The edge/cloud device may be configured to perform fusion, data processing, and operations such as 3D model drawing that require a lot of computing resources on various types of sensing data, for generating graphic data associated with the content to be displayed in the second graphic interface.

In this way, the computing resources used by the wearable device for processing the sensing data and/or generating the graphic interface are saved, so that the response speed or frame rate can be improved, and then the usable time of the wearable device is prolonged, thereby improving the user experience. Moreover, wearable devices with low hardware configurations may be used, thereby reducing the overall cost of the system. However, the present application is not limited to this. In some other embodiments, a CPU, a GPU, and the like of the wearable device may also be configured to perform the above operations performed by the edge/cloud device.

In some embodiments, the computing device may determine, based on the sensing data, whether the display device is within the field of view of the wearable device. The sensing data here may be the sensing data about the real environment (for example, images of the real environment) sensed by the camera of the wearable device, or may be data related to the movement of the user sensed by the IMU of the wearable device. Based on the data related to the movement of the user, it may be determined whether the display device has moved out of the field of view.

If it is determined that the display device is within the field of view of the wearable device, the computing device may determine the location of the display device within the field of view based on the sensing data. The computing device may determine, based on the determined location, a target area of the wearable device, so that the wearable device displays the second graphic interface in the target area. The target area matches the size of the second graphic interface indicated by the above parameter, and meets the location relationship between the second graphic interface and the first graphic interface.

Figure 5:
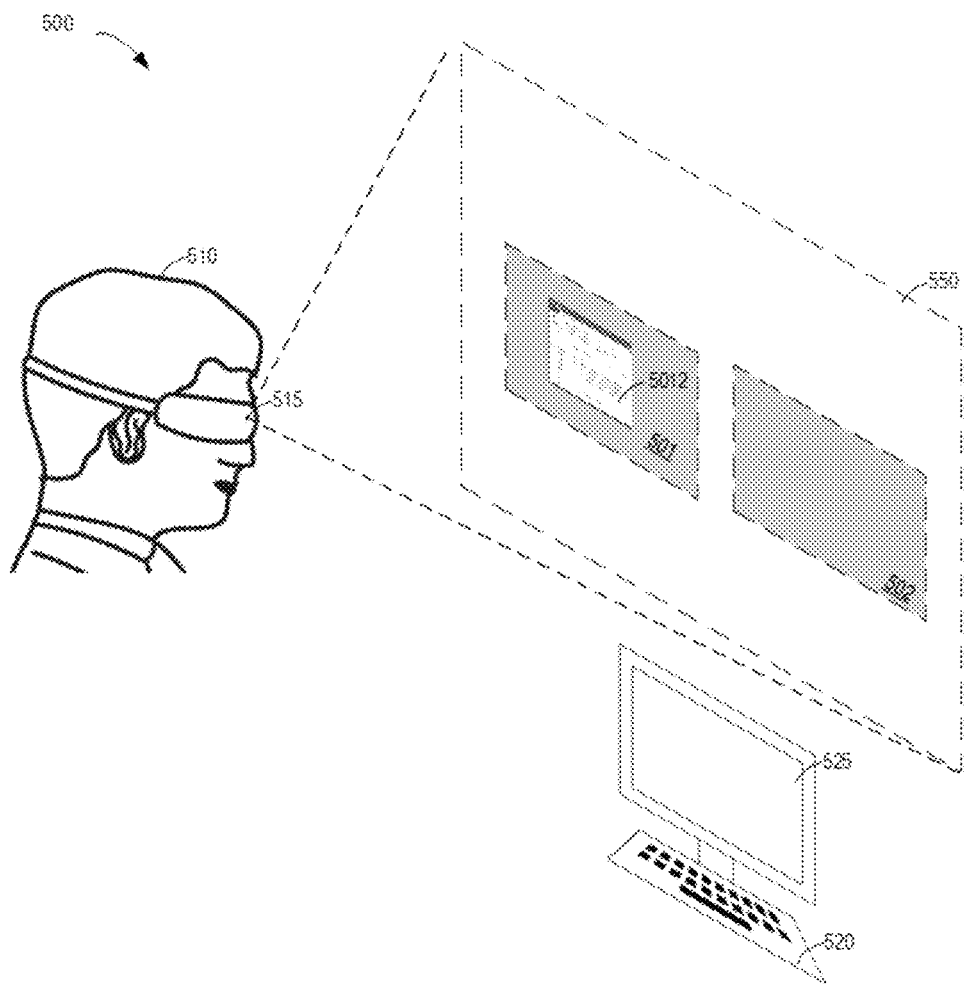
FIG. 5 is a schematic diagram of adjusting the displayed graphic interface according to an embodiment of the present disclosure.

If it is determined that the display device is not within the field of view of the wearable device, the computing device may cause the wearable device to display at least the first graphic interface and the second graphic interface. Illustration will be made with reference to FIG. 5 now. FIG. 5 is schematic diagram 500 of a graphic interface according to an embodiment of the present disclosure. For example, when user 510 stands up, or user 510 leaves the seat and walks, based on sensing data (for example, image data about a display environment and/or data related to the movement of the user) sensed by wearable device 515, it may be determined that display device 525 connected to computing device 520 is no longer located in field of view 550. In this case, computing device 520 may cause wearable device 515 to display not only second graphic interface 502 that should be displayed by wearable device 515, but also first graphic interface 501 previously displayed by display device 525, together with interface element 5012 therein. In this way, the user can still see the first graphic interface even when the user is far away from the fixed display device, and the user experience can therefore be improved.

In some embodiments, in response to that the length of time of display device 525 leaving field of view 550 reaches a predetermined threshold, the computing device may cause display device 525 to enter a dormant state (for example, a black screen or lowered brightness) to reduce the power consumption. In response to display device 525 entering the field of view again, the computing device may wake up display device 525 in the dormant state to display first graphic interface 501 again. In this way, the display device in the dormant state can be woken up more conveniently.

Figure 3A:
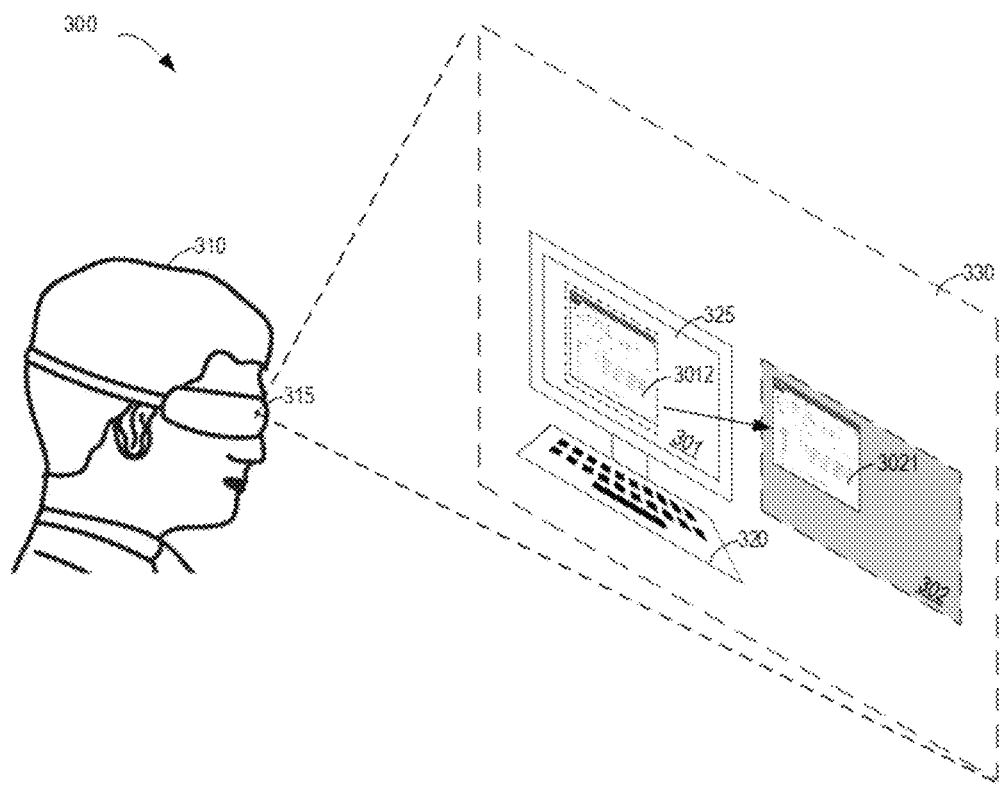
FIGS. 3A to 3C are respectively schematic diagrams of a user operating a displayed graphic interface or an interface element therein according to an embodiment of the present disclosure.
Figure 3B:
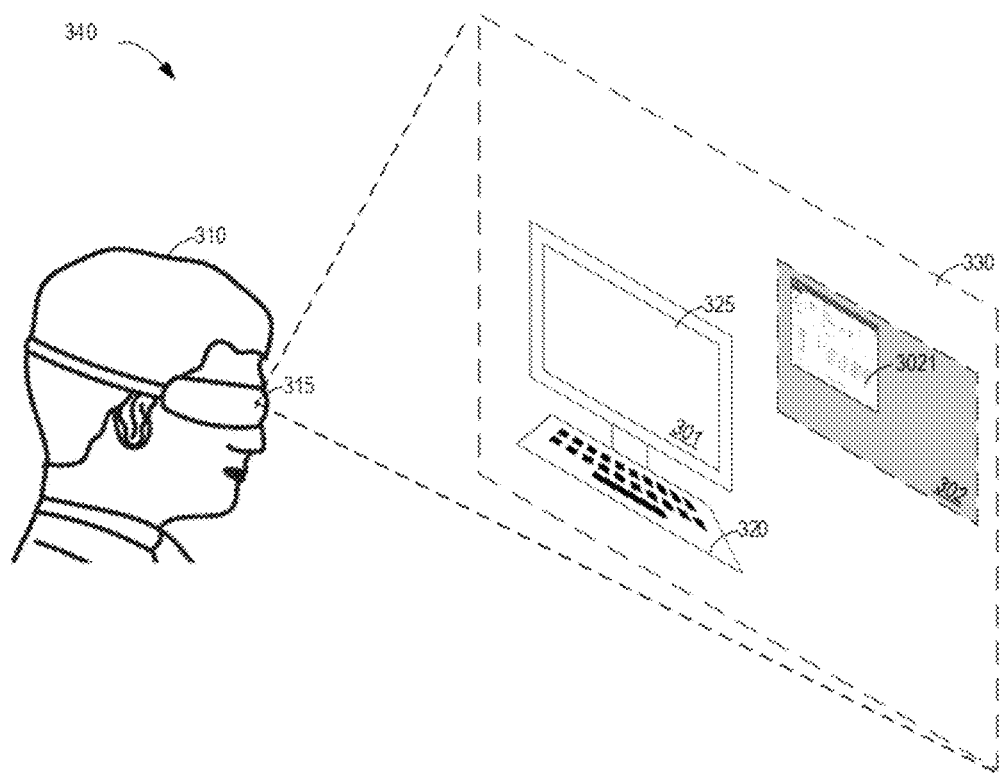
Figure 3C:
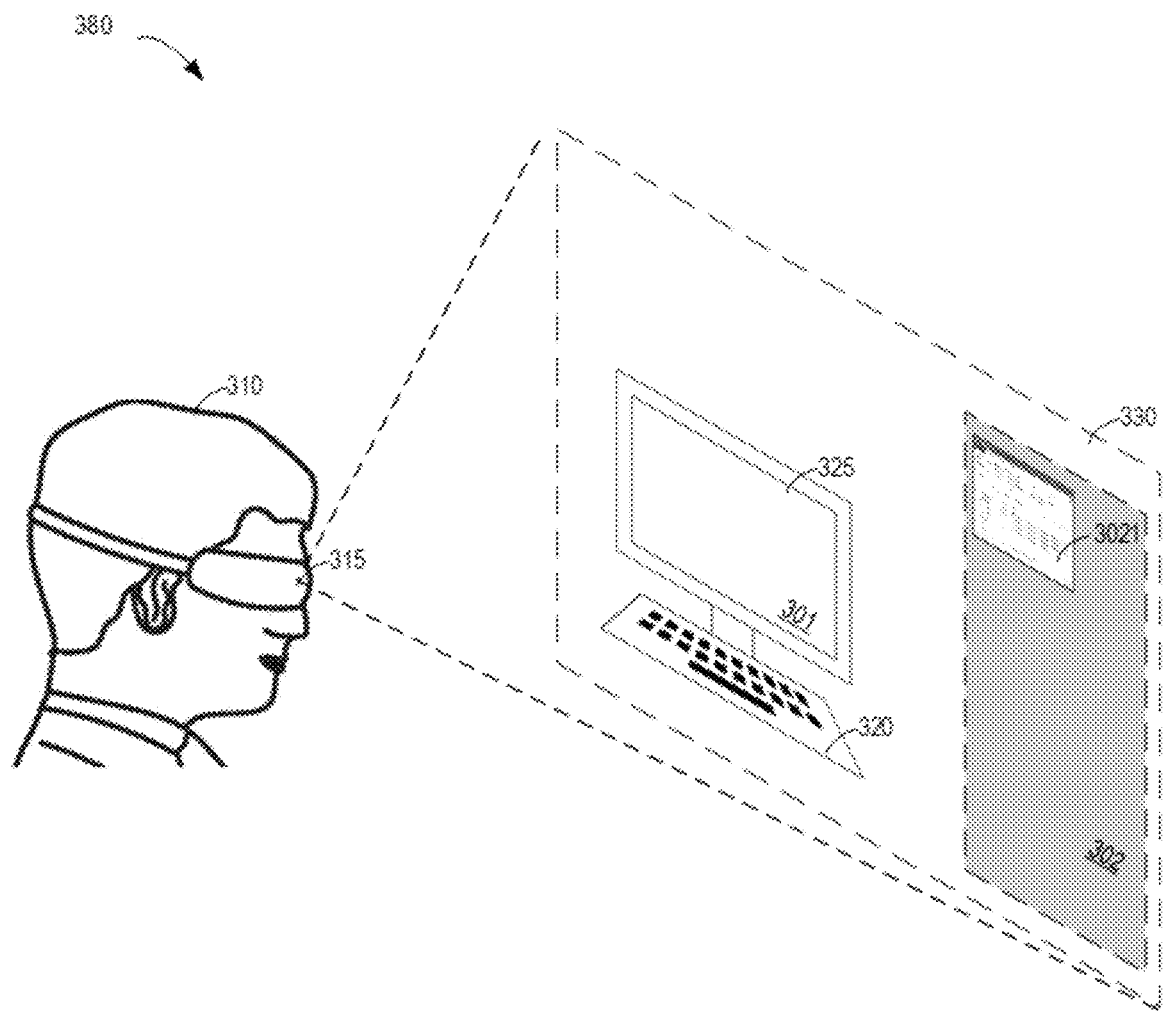

FIGS. 3A to 3C are respectively schematic diagrams of a user operating a displayed graphic interface or an interface element therein according to an embodiment of the present disclosure.

FIG. 3A shows schematic diagram 300 of user 310 moving interface element 3012 from first graphic interface 301 displayed by display device 325 of computing device 320 to second graphic interface displayed by wearable device 315, with reference to a field of view 330. FIG. 3A shows, for example, a result of performing the above operation on the graphic interface in FIG. 1. It is understandable that although the description is made by moving the interface element from the first graphic interface to the second graphic interface, a similar process may also be used to move the interface element from the second graphic interface to the first graphic interface. It is understandable that, although corresponding relationships between some user operations and interface elements in the graphic interface or actions on the graphic interface are listed below, the user may modify them as needed.

For example, the user may perform a first operation to instruct to perform a corresponding moving action for interface element 3012. The first operation may be identified by sensing data of various input devices such as sensors. Based on the sensing data, the computing device can identify a start location and a destination location corresponding to the first operation, determine a first interface element (for example, 3012) corresponding to the start location, and determine a destination graphic interface corresponding to the destination location. The destination graphic interface is one of the first graphic interface and the second graphic interface (for example, second graphic interface 302 in the example of FIG. 3A). Of course, interface element 3012 may also be dragged to a designated location on first graphic interface 301. The computing device may regenerate the first graphic interface and the second graphic interface so that the first interface element is displayed in the destination graphic interface. For example, regenerated first graphic interface 301 may no longer include interface element 3012, and regenerated second graphic interface 302 may include interface element 3021 the same as interface element 3012.

The first operation may be, for example, that the user presses a pointing device such as a mouse at a specific area of interface element 3012, and drags interface element 3012 to a designated location of second graphic interface 302, and therefore, a start location and a destination location may be determined through sensing data acquired by the pointing device.

The first operation may also be, for example, that the user designates interface element 3012 through a gesture (for example, a single finger pointing to interface element 3012), and dragging interface element 3012 to a designated location on second graphic interface 302 by the movement of the hand (for example, the single finger). Thus, a start location and a destination location may be determined through the sensing data acquired by a sensor such as a gesture tracking apparatus.

The first operation may also be, for example, that the user designates interface element 3012 through eye gaze, and designates a movement distance through a movement distance of the hand (for example, the single finger). Thus, a start location and a destination location may be determined through the sensing data acquired by sensors such as the gesture tracking apparatus and an eye tracking apparatus.

The first operation may also be, for example, that the user designates interface element 3012 through eye gaze, and designates a destination location by speaking a voice command (for example, saying "move to the second graphic interface"). Thus, a start location and a destination location may be determined through the sensing data acquired by sensors such as a voice recognition apparatus and the eye tracking apparatus.

FIG. 3B shows schematic diagram 340 of user 310 moving second graphic interface 302 including interface element 3021 displayed by wearable device 315 upward with respect to first graphic interface 301 displayed by display device 325 of computing device 320. FIG. 3B shows, for example, a result of performing the operation on the graphic interface in FIG. 3A.

For example, the user may perform a second operation to instruct to perform a corresponding moving action for second graphic interface 302. The second operation may be identified by sensing data of various input devices such as sensors. Based on the sensing data, the computing device can identify a start location and a destination location corresponding to the second operation, determine a moving direction and a distance between the two accordingly, and determine the distance as a corresponding movement distance for second graphic interface 302.

In one example, the second operation may be implemented by the user using a predetermined gesture (for example, palm up/down) to move a predetermined distance in a predetermined direction (for example, upward/downward). Therefore, the second operation may be recognized by a gesture tracking apparatus, and corresponding sensing data may be generated. It is understandable that a suitable operation may also be defined and/or pre-defined by the user to implement the moving action for second graphic interface 302.

Instead of the fixed physical display device in a traditional solution that can only display a graphic interface at a fixed location, this embodiment can support the user to arrange the virtual graphic interface at any suitable location in a simple manner, thereby improving the user experience.

FIG. 3C is schematic diagram 380 of user 310 adjusting the display direction of second graphic interface 302 including interface element 3021 displayed by wearable device 315 and the size of an occupied display area. FIG. 3C shows, for example, a result of performing the above operations on the graphic interface in FIG. 3B.

For example, the user may perform a third operation to instruct to perform a corresponding change in the display direction of second graphic interface 302 and/or adjustment on the size of the occupied display area. The third operation may be identified by sensing data of various input devices such as sensors.

In one example, the third operation may be that the user uses a predetermined gesture (for example, spreading five fingers) to rotate in a predetermined direction (for example, clockwise) to exceed a predetermined angle (for example, 45°, so that the wearable device adjusts the display direction of second graphic interface 302 from horizontal to vertical. The display direction and/or other display parameters of interface element 3021 in second graphic interface 302 may be changed accordingly or may not be changed.

Additionally or alternatively, in the same third operation, the user may simultaneously adjust the amplitude of the predetermined gesture (for example, adjust the amplitude of spreading the five fingers) to simultaneously adjust the size of the second graphic interface. It is understandable that a suitable operation may also be defined and/or pre-defined by the user to implement the moving action for second graphic interface 302.

In this way, the user can adjust the display manner and size of the virtual graphic interface conveniently or even through a simple operation, thereby improving It is understandable that similar operations may also be defined for adjusting the display direction of the interface element and the size of the occupied display area.

In some embodiments, if the adjustment to second graphic interface 302 and/or the interface element therein as described above with reference to FIGS. 3A to 3C exceeds the field of view 330 and/or exceeds the limit of the graphic interface, the computing device may also adaptively adjust the location and/or size of second graphic interface 302 and/or the interface element therein so that it can be displayed to the user in a coordinated manner.

Figure 4:
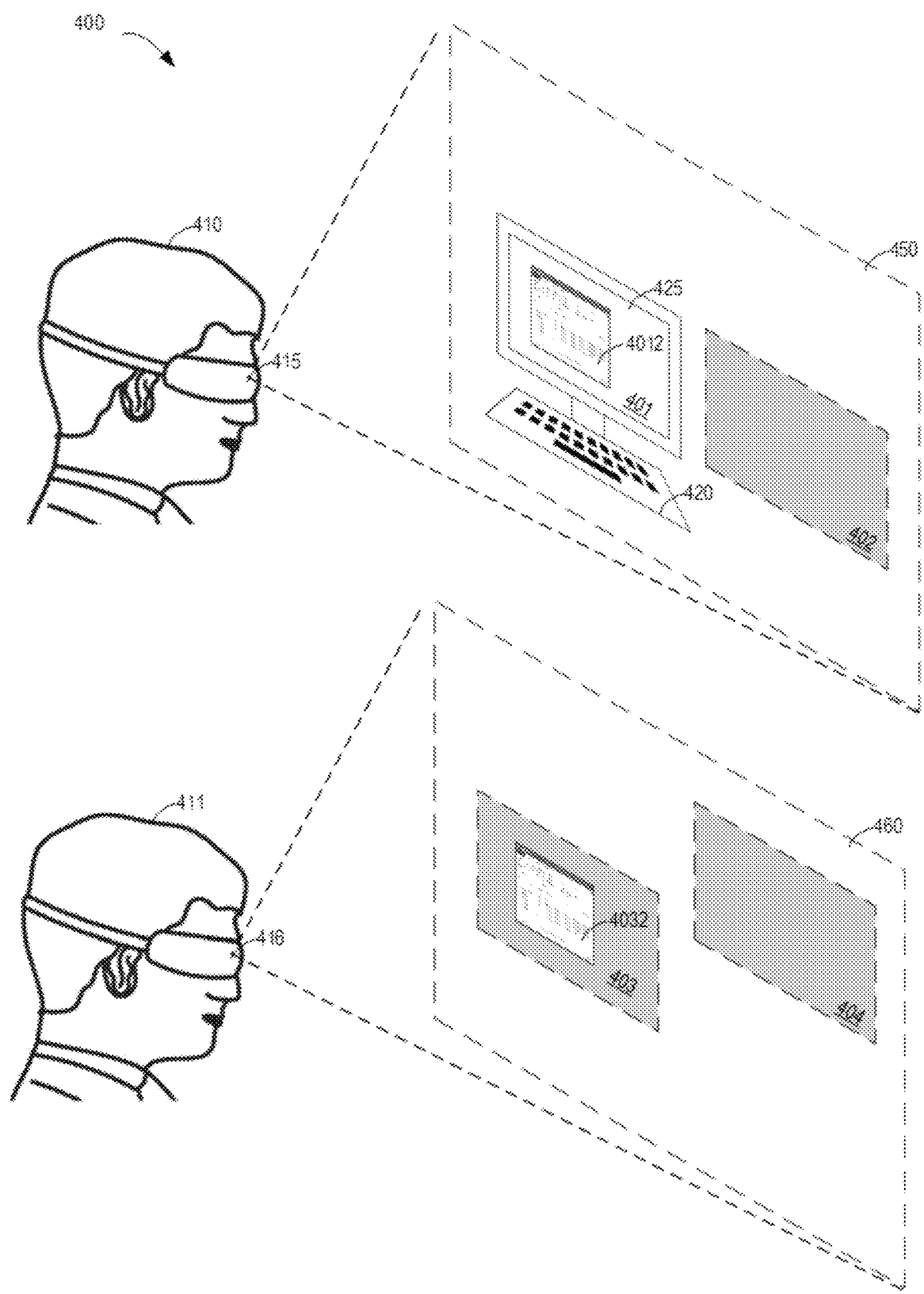
FIG. 4 is a schematic diagram of a process of sharing a graphic interface according to an embodiment of the present disclosure.

FIG. 4 is schematic diagram 400 of a process of sharing a graphic interface according to an embodiment of the present disclosure.

As shown in FIG. 4, for example, based on the sensing data, computing device 420 may determine that an operation performed by user 410 is a sharing operation of sharing at least one of first graphic interface 401 and second graphic interface 402 with another wearable device 416. The other wearable device 416 is worn by another user 411 and has functions similar to those of wearable device 415 of user 410. In some embodiments, the sharing operation may be that user 410 points to another user in field of view 450 who desires to share data and makes a predetermined gesture. In some embodiments, the sharing operation may also be that the user adjusts the body posture to face another user who desires to share data, and makes a predetermined body posture (for example, nodding).

In response to a determination that the operation performed by the user is a sharing operation, a connection is established between at least one of computing device 420 and wearable device 415 and another wearable device 416. The other wearable device may be caused to display at least one of the first graphic interface and the second graphic interface through the connection. For example, user 411 can see graphic interface 403 and graphic interface 404 through wearable device 416. Graphic interface 401 is the same as graphic interface 403, including respective interface elements 4012 and 4032 therein, and graphic interface 402 is the same as graphic interface 404.

In some embodiments, when it is determined based on the sensing data that field of view 460 of user 411 includes a physical display device, the physical display device may also be caused to display one of graphic interface 403 and graphic interface 404. The graphic interface displayed in the physical display device may be determined based on a location of the physical display device in field of view 460.

In some embodiments, graphic interface 403 and graphic interface 404 that can be seen by user 411 are not necessarily completely identical to graphic interface 401 and graphic interface 402, but contents displayed in the graphic interfaces are the same. For example, user 411 may customize the parameters for displaying a graphic interface, including but not limited to the location relationship between a plurality of graphic interfaces, display direction, display area size, resolution, font size, and the like, for meeting his/her personal preferences.

In some embodiments, user 410 may also select at least one graphic interface among a plurality of graphic interfaces, and share the selected graphic interface with user 411 through wearable device 416. For example, if it is determined, based on sensing data (for example, data related to eyeball movement), that the user is currently gazing at 4012 in graphic interface 401, wearable device 416 may be caused to display only corresponding graphic interface 403, or even only interface element 4032. If it is determined that the user's current gaze is changed to graphic interface 402, wearable device 416 may be caused to display only corresponding graphic interface 404, or after wearable device 416 is caused to display both graphic interface 403 and graphic interface 404 for a predetermined period of time, wearable device 416 may be caused to only display graphic interface 404 and graphic interface 403 is caused to disappear, for ensuring that the user to whom data is shared can clearly know the focus of the user who initiates the sharing, and at the same time, the user who initiates the sharing can independently select the interface and/or element to be shared.

In this way, graphic interface sharing between users can be flexibly realized through the wearable device, thereby improving the user experience.

Figure 6:
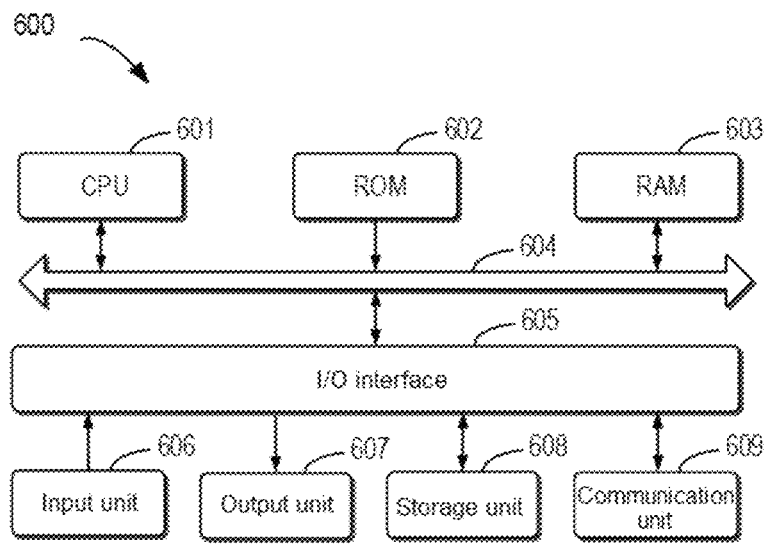
FIG. 6 is a block diagram of an example device that can be configured to implement an embodiment of the present disclosure.

FIG. 6 is a schematic block diagram of example electronic device 600 that may be used to implement an embodiment of the present disclosure. For example, electronic device 600 may be configured to implement computing device 120 as shown in FIG. 1. As shown in the drawing, device 600 includes central processing unit (CPU) 601 that may perform various appropriate actions and processing according to computer program instructions stored in read-only memory (ROM) 602 or computer program instructions loaded from storage unit 608 into random access memory (RAM) 603. In RAM 603, various programs and data required for operations of device 600 may also be stored. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices over a computer network such as an Internet and/or various telecommunication networks.

CPU 601 performs the various methods and processing described above, such as process 200. For example, in some embodiments, the various methods and processing described above may be implemented as computer software programs or computer program products, which are tangibly included in a machine-readable medium, such as storage unit 608. In some embodiments, part or all of the computer program may be loaded and/or installed onto device 600 via ROM 602 and/or communication unit 609. When the computer program is loaded into RAM 603 and executed by CPU 601, one or more steps of any process described above may be implemented. Alternatively, in other embodiments, CPU 601 may be configured in any other suitable manners (for example, by means of firmware) to perform a process such as process 200.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device capable of retaining and storing instructions used by an instruction-executing device. For example, the computer-readable storage medium may be, but is not limited to, an electric storage device, a magnetic storage device, an optical storage device, an electromagnetic storage device, a semiconductor storage device, any non-transient storage device, or any suitable combination of the foregoing. More specific examples (a non-exhaustive list) of the computer-readable storage medium include: a portable computer disk, a hard disk, a RAM, a ROM, an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, state setting data, or source code or object code written in one programming language or any combination of a plurality of programming languages, including an object oriented programming language such as Smalltalk and C++, and a conventional procedural programming language such as the "C" language or a similar programming language. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), may be customized by utilizing status information of the computer-readable program instructions. The electronic circuit may execute the computer-readable program instructions to implement various aspects of the present disclosure.

Various aspects of the present disclosure are described here with reference to flowcharts and/or block diagrams of the method, the apparatus (system), and the computer program product implemented according to the embodiments of the present disclosure. It should be understood that each block of the flowcharts and/or block diagrams and combinations of various blocks in the flowcharts and/or block diagrams can be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce an apparatus for implementing functions/actions specified in one or more blocks in the flowcharts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flowcharts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flowcharts and/or block diagrams.

The flowcharts and block diagrams in the drawings illustrate the system architectures, functions, and operations of possible implementations of the systems, methods, and computer program products according to various embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flowcharts as well as a combination of blocks in the block diagrams and/or flowcharts may be implemented using a dedicated hardware-based system that executes specified functions or actions, or using a combination of special hardware and computer instructions.

Various implementations of the present disclosure have been described above. The foregoing description is illustrative rather than exhaustive, and is not limited to the disclosed implementations. Numerous modifications and alterations are apparent to persons of ordinary skill in the art without departing from the scope and spirit of the illustrated implementations. The selection of terms used herein is intended to best explain the principles and practical applications of the implementations or the improvements to technologies on the market, and to otherwise enable persons of ordinary skill in the art to understand the implementations disclosed herein.

What is claimed is:

1. A method for displaying graphic interfaces, comprising:
    generating a first graphic interface associated with an operation performed by a user of a wearable device at a computing device connected to the wearable device;
    causing a display device of the computing device to display the first graphic interface; and
    causing the wearable device to display at least a second graphic interface, the second graphic interface being generated based on the first graphic interface and sensing data associated with the operation;
    wherein generating at least one of the first graphic interface and the second graphic interface comprises:
    identifying a start location and a destination location corresponding to the operation based on the sensing data;
    determining an interface element corresponding to the start location;
    determining a destination graphic interface corresponding to the destination location, wherein the destination graphic interface is one of the first graphic interface and the second graphic interface; and
    regenerating the first graphic interface and the second graphic interface so that the interface element is displayed in the destination graphic interface.

2. The method according to claim 1, wherein causing the wearable device to display at least a second graphic interface comprises:
    receiving the sensing data from the wearable device;
    generating graphic data related to the second graphic interface based on the sensing data and the first graphic interface; and
    sending the graphic data to the wearable device, so that the wearable device displays the second graphic interface.

3. The method according to claim 1, further comprising:
    in response to a determination that the operation is a sharing operation of sharing at least one of the first graphic interface and the second graphic interface with another wearable device, causing at least one of the computing device and the wearable device to establish a connection with the other wearable device; and
    causing the other wearable device to display at least one of the first graphic interface and the second graphic interface through the connection.

4. The method according to claim 1, wherein the wearable device comprises an augmented reality-based device.

5. The method according to claim 1, wherein the operation performed by the user comprises at least one of the following:
    a positioning operation, a click operation, a drag operation, and a scroll operation input via a pointing device, a touch operation input via a touch device, a voice command operation input via a voice recognition device, and a gesture operation, a body posture operation, and an eye movement operation input via a sensor.

6. The method according to claim 1, wherein a corresponding relationship between the operation and an interface element in the first graphic interface or an action for the first graphic interface is predefined by the user.

7. The method according to claim 1, wherein a parameter of the second graphic interface is predefined by the user, and the parameter comprises at least one of the following: a display direction, size, resolution, interface element scaling rate, and refresh frequency of the second graphic interface, and a location relationship between the second graphic interface and the first graphic interface.

8. A method for displaying graphic interfaces, comprising:
generating a first graphic interface associated with an operation performed by a user of a wearable device at a computing device connected to the wearable device;
causing a display device of the computing device to display the first graphic interface; and
causing the wearable device to display at least a second graphic interface, the second graphic interface being generated based on the first graphic interface and sensing data associated with the operation;
wherein causing the wearable device to display at least a second graphic interface comprises:
determining whether the display device is within a field of view of the wearable device based on the sensing data; and
if it is determined that the display device is not in the field of view of the wearable device, causing the wearable device to display at least the first graphic interface and the second graphic interface.

9. The method according to claim 8, wherein causing the wearable device to display at least a second graphic interface further comprises:
if it is determined that the display device is within the field of view of the wearable device, determining a location of the display device within the field of view based on the sensing data; and
determining, based on the determined location, a target area of the wearable device, so that the wearable device displays the second graphic interface in the target area.

10. An electronic device, comprising:
a processor; and
a memory coupled to the processor and having instructions stored therein, wherein the instructions, when executed by the processor, cause the electronic device to execute actions comprising:
generating a first graphic interface associated with an operation performed by a user of a wearable device at a computing device connected to the wearable device;
causing a display device of the computing device to display the first graphic interface; and
causing the wearable device to display at least a second graphic interface, the second graphic interface being generated based on the first graphic interface and sensing data associated with the operation;
wherein generating at least one of the first graphic interface and the second graphic interface comprises:
identifying a start location and a destination location corresponding to the operation based on the sensing data;
determining an interface element corresponding to the start location;
determining a destination graphic interface corresponding to the destination location, wherein the destination graphic interface is one of the first graphic interface and the second graphic interface; and
regenerating the first graphic interface and the second graphic interface so that the interface element is displayed in the destination graphic interface.

11. The electronic device according to claim 10, wherein causing the wearable device to display at least the second graphic interface comprises:
receiving the sensing data from the wearable device;
generating graphic data related to the second graphic interface based on the sensing data and the first graphic interface; and
sending the graphic data to the wearable device, so that the wearable device displays the second graphic interface.

12. The electronic device according to claim 10, further comprising:
in response to a determination that the operation is a sharing operation of sharing at least one of the first graphic interface and the second graphic interface with another wearable device, causing at least one of the computing device and the wearable device to establish a connection with the other wearable device; and
causing the other wearable device to display at least one of the first graphic interface and the second graphic interface through the connection.

13. The electronic device according to claim 10, wherein the wearable device comprises an augmented reality-based device.

14. The electronic device according to claim 10, wherein the operation performed by the user comprises at least one of the following:
a positioning operation, a click operation, a drag operation, and a scroll operation input via a pointing device, a touch operation input via a touch device, a voice command operation input via a voice recognition device, and a gesture operation, a body posture operation, and an eye movement operation input via a sensor.

15. The electronic device according to claim 10, wherein at least one of:
a corresponding relationship between the operation and an interface element in the first graphic interface or an action for the first graphic interface is predefined by the user; and
a parameter of the second graphic interface is predefined by the user, and the parameter comprises at least one of the following: a display direction, size, resolution, interface element scaling rate, and refresh frequency of the second graphic interface, and a location relationship between the second graphic interface and the first graphic interface.

16. An electronic device, comprising:
a processor; and
a memory coupled to the processor and having instructions stored therein, wherein the instructions, when executed by the processor, cause the electronic device to execute actions comprising:
generating a first graphic interface associated with an operation performed by a user of a wearable device at a computing device connected to the wearable device;
causing a display device of the computing device to display the first graphic interface; and
causing the wearable device to display at least a second graphic interface, the second graphic interface being generated based on the first graphic interface and sensing data associated with the operation;
wherein causing the wearable device to display at least the second graphic interface comprises:
determining whether the display device is within a field of view of the wearable device based on the sensing data; and
if it is determined that the display device is not in the field of view of the wearable device, causing the wearable device to display at least the first graphic interface and the second graphic interface.

17. The electronic device according to claim 16, wherein causing the wearable device to display at least the second graphic interface further comprises:
- if it is determined that the display device is within the field of view of the wearable device, determining a location of the display device within the field of view based on the sensing data; and
- determining, based on the determined location, a target area of the wearable device, so that the wearable device displays the second graphic interface in the target area.

18. A computer program product tangibly stored on a computer-readable medium and comprising machine-executable instructions, wherein the machine-executable instructions, when executed, cause a machine to perform a method for displaying graphic interfaces, the method comprising:
- generating a first graphic interface associated with an operation performed by a user of a wearable device at a computing device connected to the wearable device;
- causing a display device of the computing device to display the first graphic interface; and
- causing the wearable device to display at least a second graphic interface, the second graphic interface being generated based on the first graphic interface and sensing data associated with the operation;
- wherein generating at least one of the first graphic interface and the second graphic interface comprises:
- identifying a start location and a destination location corresponding to the operation based on the sensing data;
- determining an interface element corresponding to the start location;
- determining a destination graphic interface corresponding to the destination location, wherein the destination graphic interface is one of the first graphic interface and the second graphic interface; and
- regenerating the first graphic interface and the second graphic interface so that the interface element is displayed in the destination graphic interface.

19. The computer program product according to claim 18, wherein causing the wearable device to display at least the second graphic interface comprises:
- determining whether the display device is within a field of view of the wearable device based on the sensing data; and
- if it is determined that the display device is not in the field of view of the wearable device, causing the wearable device to display at least the first graphic interface and the second graphic interface.

20. The computer program product according to claim 19, wherein causing the wearable device to display at least the second graphic interface further comprises:
- if it is determined that the display device is within the field of view of the wearable device, determining a location of the display device within the field of view based on the sensing data; and
- determining, based on the determined location, a target area of the wearable device, so that the wearable device displays the second graphic interface in the target area.

* * * * *